United States Patent

Trethewey

Patent Number: 5,511,752
Date of Patent: Apr. 30, 1996

[54] SUCTION CUP WITH VALVE

[76] Inventor: Brig E. A. Trethewey, 4238 N. 68th Pl., Scottsdale, Ariz. 85251-2312

[21] Appl. No.: 253,063

[22] Filed: Jun. 2, 1994

[51] Int. Cl.⁶ .................................................. F16B 47/00
[52] U.S. Cl. .................................. 248/205.9; 248/205.8; 248/362
[58] Field of Search .......................... 248/205.9, 205.5, 248/205.6, 205.7, 205.8, 362, 363

[56] References Cited

U.S. PATENT DOCUMENTS

| | | | |
|---|---|---|---|
| 1,158,005 | 10/1915 | Richards, Jr. | |
| 1,518,943 | 12/1924 | Story | 248/205.5 |
| 1,883,791 | 10/1932 | Jewell | |
| 1,953,877 | 4/1934 | Chase | |
| 2,319,727 | 5/1943 | Duggan | 248/206 |
| 3,025,098 | 3/1962 | Andrews | 296/97 |
| 3,338,293 | 8/1967 | Hohmann | 160/368 |
| 3,442,476 | 5/1969 | Trimble | 248/43 |
| 3,649,069 | 3/1972 | Zip | 296/97 D |
| 4,109,957 | 8/1978 | Polizzi et al. | 296/95 C |
| 4,196,882 | 4/1980 | Rognon | 248/206 R |
| 4,261,649 | 4/1981 | Richard | 350/276 R |
| 4,378,126 | 3/1983 | Procenko | 294/1 CA |
| 4,406,246 | 9/1983 | DeMeyer et al. | 118/505 |
| 4,532,668 | 8/1985 | Slonicki et al. | 15/104.92 |
| 4,560,251 | 12/1985 | Murjahn | 350/283 |
| 4,607,875 | 8/1986 | McGirr | 296/97 D |
| 4,702,517 | 10/1987 | Maeda et al. | 296/214 |
| 4,736,980 | 4/1988 | Eubanks | 296/97 D |
| 4,746,162 | 5/1988 | Maness | 296/97 R |
| 4,842,322 | 6/1989 | Iu | 296/97.7 |
| 4,872,721 | 10/1989 | Sniadach | 296/97.2 |
| 5,080,309 | 1/1992 | Ivins | 248/205.8 |
| 5,087,005 | 2/1992 | Holoff et al. | 248/205.8 |
| 5,104,077 | 4/1992 | Liu | 248/363 |
| 5,176,357 | 1/1993 | Hobart | 248/683 |
| 5,201,913 | 4/1993 | Vliet | 294/64.1 |
| 5,263,760 | 11/1993 | Sohol | 248/205.9 |

Primary Examiner—Karen J. Chotkowski
Assistant Examiner—Anita M. King
Attorney, Agent, or Firm—Cahill, Sutton & Thomas

[57] ABSTRACT

A cap, mounted upon the stem of a suction cup, is axially repositionable by axial and/or tilting movement relative to the stem to selectively close or open fluid communication between the concave space defined by the cup element of the suction cup and the ambient environment.

3 Claims, 2 Drawing Sheets

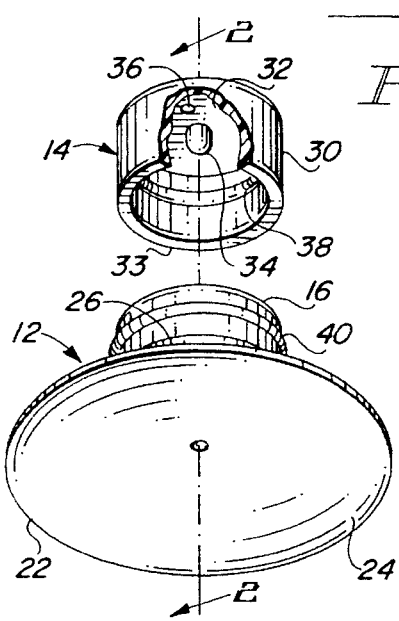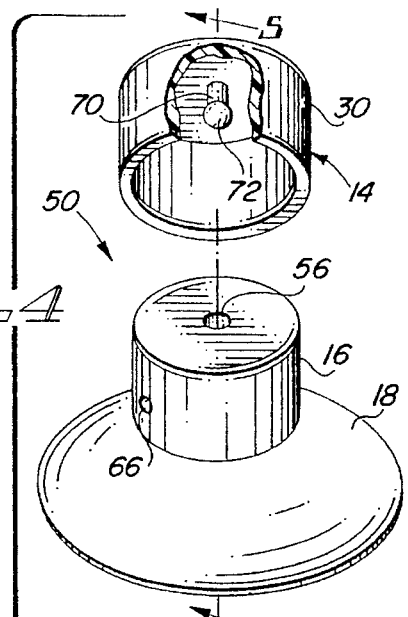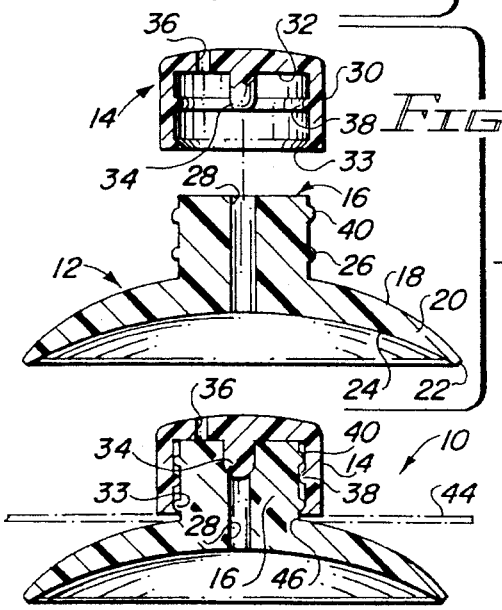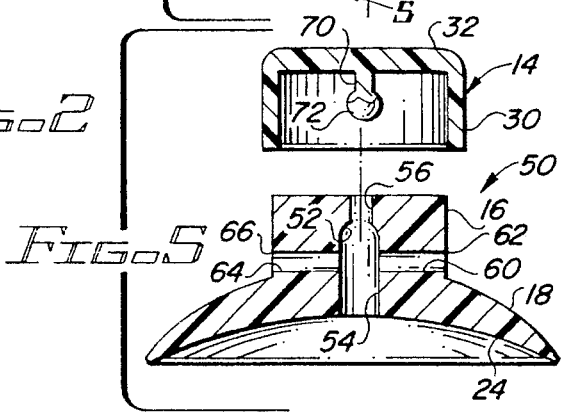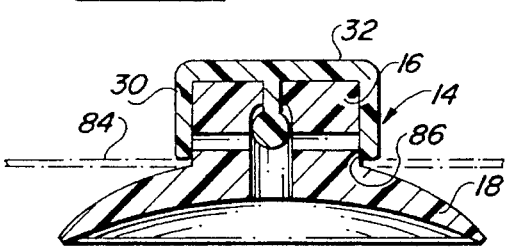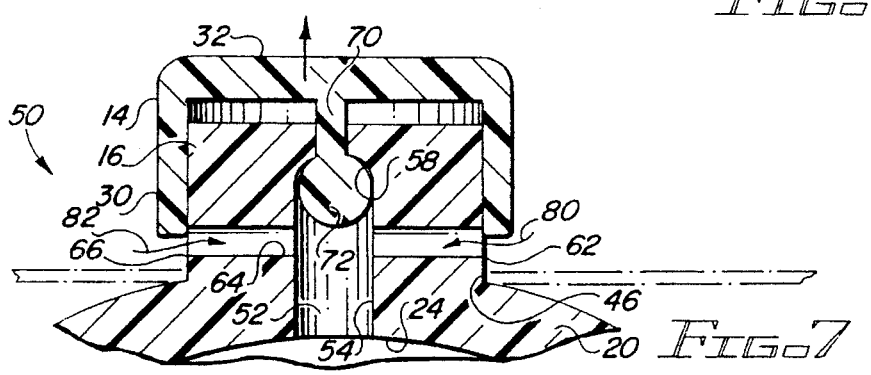

SUCTION CUP WITH VALVE

BACKGROUND OF THE INVENTION

1. Field of the Invention

The present invention relates to suction cups and, more particularly, to suction cups with a valve for relieving the below ambient pressure.

2. Description of Related Art

Suction cups made of various flexible materials, whether natural or man made, include a spherical concave side in the cup element. Upon pressing the concave side against a smooth impermeable surface, the air within the concavity is forced outwardly past the perimeter of the suction cup. The natural tendency of the suction cup is to rebound but such rebounding is precluded by the ambient pressure being greater than the pressure present in the volume defined between the surface and the concave side. The conventional manner for releasing a suction cup is that of lifting the perimeter of the cup element to permit air flow into the volume or space between the suction cup and the underlying surface. Another, less elegant, way of removing a suction cup from a surface is that of forcibly pulling upon the stem of the suction cup to overcome the pressure differential between ambient pressure and the pressure within the volume or space between the suction cup and the underlying surface.

The inconvenience of existing suction cups is evident in automotive applications where suction cups have been used to hold sheets of sunshade materials adjacent a window. Release of such suction cups may require the use of two hands or at least looking at the suction cup of the sunshade when relocating it. Such distractions to the driver are not only inconvenient but potentially life-threatening.

SUMMARY OF THE INVENTION

The stem of a suction cup extending generally from the top center of the cup element of a suction cup includes a passageway in communication between the ambient environment and the space defined by the spherical concave side of the cup element. As a result of air flow through the passageway, any pressure differential between ambient pressure and the pressure adjacent the concave side will be relieved. A cap, slidably mounted upon the stem, includes a stopper for selectively sealing the passageway as a function of the position of the cap with respect to the stem. In the sealed position of the stopper, the suction cup will function normally. To equalize the pressure between ambient pressure and the pressure adjacent the concave side of the suction cup, the cap is repositioned to open the passageway and permit air flow into the space between the concave side and underlying surface. Thereafter, the suction cup may be readily removed.

The sidewall of the cap permits one handed gripping to effect automatic release for removal, and it serves as a handle for relocation and reattachment on an intuitive bases and without visual reference.

It is therefore a primary object of the present invention to provide a release mechanism for dismounting a suction cup.

Another object of the present invention is to provide a selectively openable passageway extending to the concave side of a suction cup.

Yet another object of the present invention is to provide a translatable cap mounted upon the stem of a suction cup for relieving the below ambient pressure attendant a mounted suction cup.

Still another object of the present invention is to provide a selectively removable stopper for closing a passageway in communication with a concave side of a suction cup.

A further object of the present invention is to provide a stem mounted slidable captured cap for releasing a suction cup as a function of the position of the cap.

A yet further object the present invention is to provide an inexpensive suction cup having a release mechanism.

A still further object of the present invention is to provide a suction cup assembly having an automatic one handed attachment and release on positioning the assembly upon a supporting surface or pulling the assembly from the supporting surface.

A still further object of the present invention is to provide a suction cup supported sunshade which does not require manual contact with the sun shade upon mounting or dismounting the sun shade.

A still further object of the present invention is to provide a method for releasing a suction cup.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 1 illustrates an exploded bottom quarter view of the components of the valved suction cup;

FIG. 2 illustrates a cross-sectional view taken along lines 2—2, as shown in FIG. 1;

FIG. 3 illustrates a cross-sectional view of the valved suction cup in the closed state;

FIG. 4 illustrates an exploded view of the components of a variant of the valved suction cup;

FIG. 5 illustrates a cross sectional view taken along lines 5—5, as shown in FIG. 4;

FIG. 6 illustrates a cross sectional view of the variant suction cup in the closed state;

FIG. 7 illustrates the air flow paths of the variant suction cup in the open state;

DESCRIPTION OF THE PREFERRED EMBODIMENT

Figure 8:
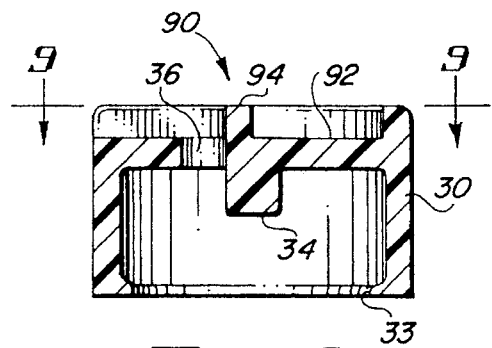
FIG. 8 illustrates a variant of the cap depicted in FIGS. 1–3.

Suction cups have been used for years to removably secure an element attached to the suction cup to an air impermeable surface. Such attachment is effected by a cup element of flexible material, usually a rubber like composition or a plastic composition, defining a concave surface. Upon pressing the suction cup against a surface, the cup element is flattened to reduce the volume defined by the concave surface through outward flexing of the skirt defining the cup element. The perimeter of the skirt adjacent the surface forms a seal to prevent inflow of air therebetween. Ambient pressure, being greater than the pressure within any remaining volume or space within the cup element adjacent the underlying surface, retains the suction cup in place. To remove the suction cup, the perimeter of the skirt may be lifted to permit air flow into the space defined by the concave surface to equalize the pressure therein with ambient pressure. Alternatively, the suction cup may be simply pulled away from the surface. The latter method of removal may cause damage to the underlying surface or may be difficult, depending upon the size of the suction cup.

Either method of removal of a suction cup effects removal by establishing fluid communication between the ambient environment and the low pressure environment created within the concave space defined by the cup element. To avoid possible damage to the perimeter of the suction cup resulting from repeated lifting or prying the perimeter upwardly and to eliminate the likelihood of damage to either the underlying surface or the suction cup resulting from forced removal, a valved passageway to the space defined by the concave side of the suction cup is provided by the present invention.

Referring to FIG. 1, there is illustrated a suction cup assembly 10 formed of a suction cup 12 and a cap 14. As further shown in combination with FIGS. 2 and 3, cap 14 is slidably mounted upon stem 16 extending from the top center of cup element 18 of suction cup 12. Cup element 18 includes a skirt 20 having a perimeter 22 and defining a concave surface 24. Stem 16 may be cylindrical in configuration and includes an annular ridge 26. A passageway 28 extends through stem 16 into fluid communication with the space defined by concave surface 24.

Cap 14 includes a cylindrical side wall 30 depending from an end wall 32. The diameter side wall 30 is commensurate with stem 16 to permit engagement and sliding movement therebetween. This side wall permits easy gripping of the suction cups during attachment, removal and relocation. An interiorly extending radial lip 33 is disposed in side wall 30. A stopper 34 depends from end wall 32. An aperture 36 is disposed in the end wall.

Upon mounting of cap 14 on stem 16, lip 33 is forced passed annular ridge 26, as illustrated in FIG. 3. The resulting available axial movement of the cap with respect to the stem is limited in the upward direction by lip 33 engaging annular ridge 26 and in the opposite direction by the lip, or the lower end of the cap, contacting cup element 18.

The diameter of stopper 34 is commensurate with passageway 28 to cause closure of the passageway upon penetrable engagement by stopper 34. The length of the stopper is less than the length of the axial movement of cap 14 after disengagement with ridge 26 and before disengagement of the cap with the stem. Thereby, the stopper is drawn out of engagement with the passageway when the cap is raised and the stopper engages the passageway upon forcing the cap toward cup element 18. When stopper 34 is out of engagement with passageway 28, fluid communication between the space defined by concave surface 24 and the ambient environment is via passageway 28, the interior of cap 14 and aperture 36 in the end wall of the cap.

When cap 14 is in its seated position upon stem 16, was illustrated in FIG. 3, stopper 34 is in sealed engagement with passageway 28. Suction cup assembly 10 may then be used in the normal manner. To remove suction cup assembly 10 from a surface to which it is attached, cap 14 is raised by axial displacement along stem 16 to an extent sufficient to withdraw stopper 34 from within passageway 28. Upon such withdrawal, air from the ambient environment flows through aperture 36, the interior of cap 14 and passageway 28 into the space defined by concave surface 24. Thus, the pressure in the space defined by the concave surface is equalized with the pressure of the ambient environment and skirt 20 is free to resume its curved configuration illustrated in FIG. 2 and the suction cup assembly may be removed. Upon pulling upon the cap of the cup assembly to release and remove the cup assembly, the resulting release of the vacuum occurs effortlessly and to the extent that a user is not aware of the act of release.

As suggested in FIG. 3, cap 14 may be used as a holding device for securing an element, such as a sheet of material 44. The sheet material may be a transparent or opaque sun shade positioned adjacent a window, such as a car window. In this environment the sheet material may be polycarbonate material as it is tough and resists deformation from heat. It also tends to resist deterioration from UV radiant energy. However, polycarbonate sheet material is easily smudged by fingerprints, etc. Because suction cup assembly 10 can be attached/detached from a supporting surface without contacting the polycarbonate sheet material, smudging of it can be readily avoided by use of the cup assembly. The sheet material includes an aperture 46 size commensurate with the perimeter of stem 16 but of a size less than the outside perimeter of cap 14. Thereby, the cap retains the apertured sheet of material intermediate the cap and suction cup 18. Such retention may be augmented by ridge 26 interfering with lip 33 to prevent axial displacement of cap 14. Alternatively, aperture 46 may be sized to require a press fit on the stem.

In a variant, lip 33 and a rib 38 may be disposed within the side wall of cap 14 to cooperate with corresponding ridge 26 and/or ridge 40 disposed about stem 16. For example, ridge 26 may be used to limit axial movement of the cap as a result of interference between the ridge and lip 33. The displacement of ridge 26 relative to cup element 18 urges restraint on the degree of axial movement intermediate the cap and the stem. Rib 38 upon contact with the lower side of ridge 40 impedes further axial movement of the cap to retain stopper 34 within passageway 28. By forcing rib 38 past ridge 40, the stopper disengages from the passageway; however, disengagement of the cap from the stem is prevented by the interference between lip 33 and ridge 26. Alternatively, ridge 26 can be eliminated and the impediment to axial movement of the cap relative to the stem, sufficient to disengage stopper 34 from passageway 28, is maintained by interference between ridge 40 and rib 38. When the cap is forced to slide rib 38 over and past ridge 40, the stopper becomes disengaged from the passageway. Complete removal, or at least removal only with difficulty, can be retained by interference between lip 33 and ridge 40. It is to be understood that the relative locations of these ridges, rib and lip, as well as their radial dimensions can be varied to control the relative movement between the cap and the stem and the lengths of the stopper and the passageway can be varied as a function of the ridge, rib and lip.

Referring jointly to FIGS. 4–7, a variant 50 of suction cup assembly 10 will be described. The reference numerals for suction cup assembly 10 for elements common with variant 50 will be employed. Stem 16 includes a stepped passageway 52 having a lower end 54 of a first diameter and an upper end 56 of a reduced diameter. Junction 58 between the upper and lower ends of passageway 52 may be a spherical section, as illustrated. A further passageway 60 extends form lower end 54 to opening 62 disposed in the exterior wall of stem 16. A yet further passageway 64 may extend from lower end 54 to opening 66 disposed in the side wall of stem 16.

Cap 14 includes sidewall 30 depending from end wall 32, which side wall is commensurate with stem 16 to permit sliding engagement therebetween and closure of openings 62 and 66 upon fully seating cap 14 upon stem 16. A prong 70 depends from end wall 32 and includes a bulbous end 72, which end may be spherical, as illustrated. Cap 14 is fitted upon stem 16 by forcing bulbous end 72 through upper end 56 of passageway 52 until the bulbous end is disposed within lower end 54 of the passageway, as illustrated in FIGS. 6 and 7.

Upward movement of cap 14 relative to stem 16 is limited by bulbous end 72 engaging junction 58, as illustrated in FIG. 7. In this position, the lower of sidewall 30 exposes at least parts of openings 62 and 66. Such exposure permits air flow, as depicted by arrows 80, 82 into further passageway 60 yet further passageway 64, respectively, and into lower end 54 of passageway 52. As passageway 52 is in fluid communication with the space defined by concave surface 24, the pressure within this space is equalized with ambient pressure. Upon pressing cap 14 onto stem 16, openings 62 and 66 will be closed by side wall 30. Such closure will permit the suction cup assembly to operate in a normal manner.

As particularly illustrated in FIG. 6, cap 14 may be used to secure sheet material in place. In particular, a sheet of material 84, having an aperture 86 formed therein commensurate with the diameter of stem 16 is penetrably mounted upon the stem. Cap 14, having a diameter greater than aperture 86, prevents removal of the sheet of material.

Figure 9:
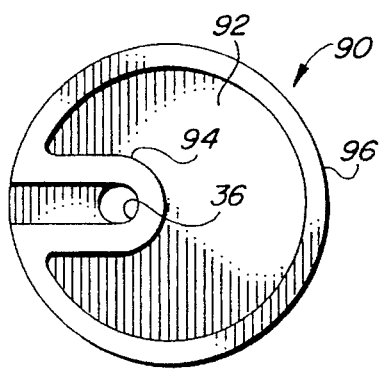
FIG. 9 is a top view taken along lines 9—9, as shown in FIG. 8.

Referring jointly to FIGS. 8 and 9, there is illustrated a variant 90 of cap 14. Reference numerals corresponding with like elements of cap 14 will be used in describing variant 90. Side wall 30 includes an inwardly radially extending lip 33. A stopper 34 extends from end wall 92 and the end wall includes an aperture 36 formed therein. Upon pressing variant 90 upon stem 16, there is a possibility that aperture 36 will be covered by a user's finger or thumb, which covering will prevent outflow of air from within the cap. To prevent covering of aperture 36 upon pressing cap 14 onto stem 16, a ridge 94 extends about a part of aperture 36. This ridge may be U-shaped, as illustrated in FIG. 9 to permit unimpeded air flow into and out of aperture 36 even if the top of end wall 92 is covered. As illustrated, ridge 94 may include a further ridge segment 96 extending about the perimeter of end wall 92 from opposed sides of U-shaped ridge 94.

Figure 10:
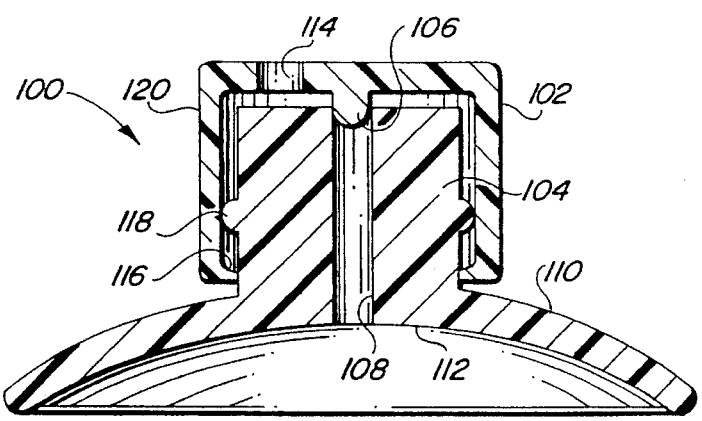
FIG. 10 is a cross sectional view illustrating a further variant of the cap depicted in FIGS. 1–3.
Figure 11:
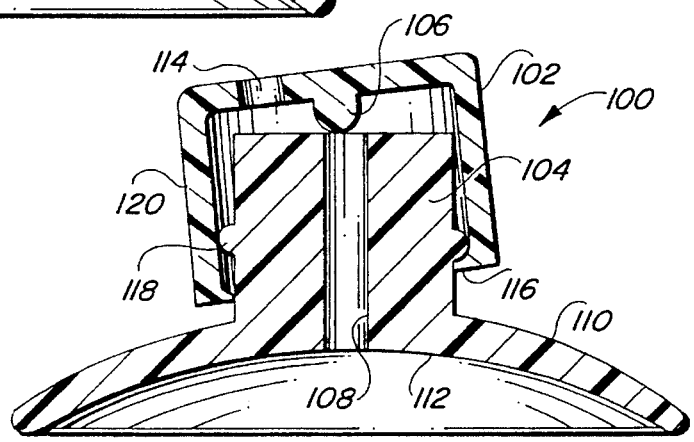
FIG. 11 illustrates operation of the further variant shown in FIG. 10.

Referring jointly to FIGS. 10 and 11, there is illustrated a further variant of the cap shown in FIGS. 1–3. Depending in part on the tolerances of the cap and suction cup stem illustrated in FIGS. 1–3, release of suction from within the cup element requires translation of the cap essentially along the longitudinal axis of the stem. When an attached sunshade is used by a driver within the vehicle, rapid release and relocation of the sunshade may be necessary. Preferably, such relocation should be accomplished with minimal attention by the driver to prevent distraction. The further variant illustrated in FIGS. 10 and 11 embodies a suction cup assembly 100 which permits either axial translation of cap 102 with respect to stem 104 or simple tilting of the cap with respect to the stem to disengage stopper 106 with passageway 108. As illustrated, passageway 108 extends to and is in fluid communication with the interior of cup element 110 defined by concave surface 112. Upon release of stopper 106 from passageway 108, any suction present within the cup element will be relieved through opening 114 in cap 102, as described above. The radially inwardly directed lip 116, which may be disposed at the lower edge of cap 102 or upwardly therefrom, interferingly engages with an annular ridge 118 disposed about stem 104. By appropriate dimensioning of the axial length of skirt 120 of cap 102 with respect to stem 104 and ridge 118, axial movement of the cap sufficient to disengage stopper 106 from passageway 108 is possible before lip 116 engages ridge 118. By dimensioning the diameter of stem 104 to be less than that of the inside diameter of skirt 120, tilting of cap 102 with respect to the stem can be accomplished, as illustrated in FIG. 11. Such tilting will inherently result in sufficient axial translation of the cap relative to the stem to bring about disengagement of stopper 106 from passageway 108. Thus, a user of suction cup assembly 100 can simply cause tilting of cap 102, which tilting will release the grip of the cup element with an underlying smooth impervious surface. Axial translation of the cap relative to the stem will produce similar disengagement as will a combination of induced axial translation and tilting. It is therefore apparent that the further variant illustrated in FIGS. 10 and 11 provides an easy to use apparatus for relieving the gripping force exerted by suction cup assembly 100.

Figure 12:
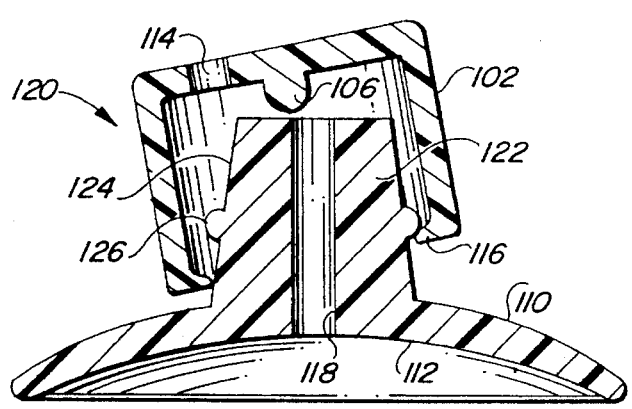
FIG. 12 illustrates the further variant in combination with a modified stem of a suction cup.

Referring to FIG. 12, there is illustrated a modification of the further variant embodied in suction cup assembly 121. Elements of suction cup assembly 121 common with suction cup assembly 100 will be identified with common reference numerals. To encourage and render more facile tilting of cap 102, stem 122 includes a tapered side wall 124 whereby the stem defines a truncated cone. The smaller diameter of the upper end of the stem permits greater tilting than if the stem were not tapered. A ridge 126 disposed about stem 122 interferingly engages with lip 116 to prevent inadvertent disengagement of cap 102 from stem 122 and yet permit a combination of axial translation and tilting of the cap relative to the stem. In operation, a user can readily simply tilt the cap relative to the stem and cup element to bring about sufficient movement of the cap relative to the stem to disengage stopper 106 from passageway 108. Upon such disengagement, the suction force exerted by cup element 110 will be dissipated in the suction cup assembly and attached sunshade or other element is readily released for relocation.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

I Claim:

1. A valved suction cup assembly, said assembly comprising in combination:

a) a cup element defining a concave space;

b) a stem having a first cross-section extending from said cup element;

c) a passageway extending through said stem from the concave space to an opening in the surface of said stem; and d) a cap having a second cross-section and being axially repositionable upon said stem for selectively opening and closing said opening in said stem as a function of the position of said cap relative to said stem, the relative cross-sections of said stem and said cap accommodating tilting of said cap relative to said stem to open and close said opening in said stem.

2. The valved suction cup assembly as set forth in claim 1 wherein at least a part of said stem is tapered.

3. The valved suction cup assembly as set forth in claim 1 wherein said cap includes a stopper for closing the opening in said stem.

* * * * *